US012654400B2

(12) United States Patent
Martinez, Jr. et al.

(10) Patent No.: US 12,654,400 B2
(45) Date of Patent: Jun. 16, 2026

(54) SINGULATION AND EDGE-SEALING OF MULTILAYER POLYMER EYEPIECE

(71) Applicant: MAGIC LEAP, INC., Plantation, FL (US)

(72) Inventors: Arturo Manuel Martinez, Jr., Austin, TX (US); Joseph Christopher Sawicki, Austin, TX (US); Jeffrey Dean Schmulen, Austin, TX (US); David Carl Jurbergs, Austin, TX (US)

(73) Assignee: Magic Leap, Inc., Plantation, FL (US)

( * ) Notice: Subject to any disclaimer, the term of this patent is extended or adjusted under 35 U.S.C. 154(b) by 210 days.

(21) Appl. No.: 18/560,049

(22) PCT Filed: May 24, 2022

(86) PCT No.: PCT/US2022/072536
§ 371 (c)(1),
(2) Date: Nov. 9, 2023

(87) PCT Pub. No.: WO2022/251832
PCT Pub. Date: Dec. 1, 2022

(65) Prior Publication Data
US 2024/0227315 A1      Jul. 11, 2024

Related U.S. Application Data

(60) Provisional application No. 63/193,311, filed on May 26, 2021.

(51) Int. Cl.
| | |
|---|---|
| *B32B 7/12* | (2006.01) |
| *B23K 26/38* | (2014.01) |
| *B23K 26/402* | (2014.01) |
| *B29C 65/16* | (2006.01) |
| *B29C 65/74* | (2006.01) |
| *B32B 27/08* | (2006.01) |
| *G02B 25/00* | (2006.01) |
| *B23K 103/00* | (2006.01) |

(52) U.S. Cl.
CPC ........... *B29C 65/743* (2013.01); *B23K 26/38* (2013.01); *B23K 26/402* (2013.01); *B29C 65/16* (2013.01); *B32B 7/12* (2013.01); *B32B 27/08* (2013.01); *G02B 25/001* (2013.01); *B23K 2103/42* (2018.08); *B32B 2307/418* (2013.01); *B32B 2307/7376* (2023.05); *B32B 2551/00* (2013.01)

(58) Field of Classification Search
None
See application file for complete search history.

(56) References Cited

U.S. PATENT DOCUMENTS

| | | | | |
|---|---|---|---|---|
| 4,238,263 | A | * | 12/1980 | LoMaglio ........... B29C 67/0044 |
| | | | | 264/285 |
| 4,356,053 | A | * | 10/1982 | LoMaglio ........... B29C 67/0044 |
| | | | | 156/499 |
| 11,199,658 | B2 | | 12/2021 | Martinez, Jr. et al. |
| 11,318,692 | B2 | | 5/2022 | Chang et al. |
| 11,726,317 | B2 | | 8/2023 | Li et al. |
| 11,787,138 | B2 | | 10/2023 | Chang et al. |
| 2004/0005769 | A1 | | 1/2004 | Mikolas |
| 2004/0151434 | A1 | | 8/2004 | Galstian et al. |
| 2005/0250292 | A1 | | 11/2005 | Baluswamy et al. |
| 2007/0202619 | A1 | | 8/2007 | Tamura et al. |
| 2010/0102042 | A1 | | 4/2010 | Garner et al. |
| 2013/0051730 | A1 | | 2/2013 | Travers et al. |
| 2013/0229712 | A1 | | 9/2013 | Kress |
| 2013/0286686 | A1 | | 10/2013 | Kettunen et al. |
| 2014/0300966 | A1 | | 10/2014 | Travers et al. |
| 2016/0139402 | A1 | | 5/2016 | Lapstun |
| 2017/0115456 | A1 | | 4/2017 | Sugama |
| 2017/0214907 | A1 | | 7/2017 | Lapstun |
| 2018/0052320 | A1 | | 2/2018 | Curtis et al. |
| 2018/0186678 | A1 | | 7/2018 | Boeker et al. |
| 2019/0111642 | A1 | | 4/2019 | Chang et al. |
| 2019/0170932 | A1 | | 6/2019 | Miller et al. |
| 2019/0185376 | A1 | | 6/2019 | Ito et al. |
| 2020/0041712 | A1 | | 2/2020 | Peroz et al. |
| 2020/0081246 | A1 | | 3/2020 | Olkkonen et al. |
| 2020/0110206 | A1 | | 4/2020 | Rahomäki et al. |
| 2020/0144109 | A1 | | 5/2020 | Meyer et al. |
| 2020/0400941 | A1 | | 12/2020 | Li et al. |
| 2020/0402871 | A1 | | 12/2020 | Li et al. |
| 2021/0191041 | A1 | | 6/2021 | Martinez, Jr. et al. |
| 2021/0405372 | A1 | | 12/2021 | Chang et al. |
| 2022/0082739 | A1 | | 3/2022 | Franke et al. |

(Continued)

FOREIGN PATENT DOCUMENTS

| | | | |
|---|---|---|---|
| CN | 105572795 | A | 5/2016 |
| EP | 1385023 | A1 | 1/2004 |

(Continued)

OTHER PUBLICATIONS

Extended European Search Report in European Appln. No. 21829320.7, dated Nov. 7, 2023, 6 pages.

(Continued)

*Primary Examiner* — Sheeba Ahmed

(74) *Attorney, Agent, or Firm* — Fish & Richardson P.C.

(57) ABSTRACT

Fabricating a multilayer optical component includes obtaining a substrate having a multiplicity of polymer layers and cutting the substrate with a $CO_2$ laser to yield a multilayer optical component having a first surface, a second surface opposite the first surface, and a blackened edge along a perimeter of the multilayer optical component. The multiplicity of polymer layers is sealed along the blackened edge. The resulting multilayer optical component includes a multiplicity of polymer layers and a blackened edge seal around the multiplicity of polymer layers. The blackened edge seal includes polymer melt from the multiplicity of polymer layers.

8 Claims, 6 Drawing Sheets

(56) References Cited

U.S. PATENT DOCUMENTS

| | | |
|---|---|---|
| 2022/0091336 A1 | 3/2022 | Martinez, Jr. et al. |
| 2022/0242076 A1 | 8/2022 | Chang et al. |
| 2023/0359036 A1 | 11/2023 | Li et al. |
| 2023/0373174 A1 | 11/2023 | Chang et al. |

FOREIGN PATENT DOCUMENTS

| | | |
|---|---|---|
| JP | 2000121819 A | 4/2000 |
| JP | 2015534117 A | 11/2015 |
| JP | 2018511139 A | 4/2018 |
| JP | 2018533069 A | 11/2018 |
| JP | 2018534597 A | 11/2018 |
| KR | 20060102261 A | 9/2006 |
| WO | 2017094493 A1 | 6/2017 |
| WO | 2018236725 A1 | 12/2018 |
| WO | 2019135837 A1 | 7/2019 |
| WO | 2020263866 A1 | 12/2020 |

OTHER PUBLICATIONS

International Search Report and Written Opinion in International Appln. No. PCT/US2021/039208, mailed Sep. 30, 2021, 10 pages.
International Search Report and Written Opinion in International Appln. No. PCT/US2022/072536, mailed Aug. 15, 2022, 11 pages.
Office Action in Japanese Appln. No. 2022-578825, mailed on Jan. 23, 2025, 12 pages (with English translation).
Office Action in Chinese Appln. No. 202180045046.3, mailed on Jul. 23, 2025, 14 pages (with English translation).

* cited by examiner

*100*

| | |
|---|---|
| Lamination | *102* |

| | |
|---|---|
| Singulation and edge seal with $CO_2$ laser | *104* |

| | |
|---|---|
| Characterization | *106* |

300

302a     302b

SINGULATION AND EDGE-SEALING OF MULTILAYER POLYMER EYEPIECE

This application is a National Stage application under 35 U.S.C. § 371 of International Application No. PCT/US2020/072536, having an International Filing Date of May 24, 2022, which claims the benefit of U.S. Provisional Ser. No. 63/193,311 filed May 26, 2021. This disclosure of the prior application is incorporated by reference in the disclosure of this application.

TECHNICAL FIELD

This invention relates to a method to cut, darken, and adhere a multilayer polymer eyepiece.

BACKGROUND

Multilayer eyepiece fabrication typically includes several independent steps, such as singulating, laminating, and edge-sealing the layers, or singulating, laminating, and bonding the perimeter of the multilayer laminate to a frame to yield a framed multilayer eyepiece. However, singulating and edge sealing are time-intensive. Additionally, a multilayer eyepiece and a frame to which it is bonded can expand at different rates with a change in temperature, resulting in decreased optical performance.

SUMMARY

The present disclosure describes a process to cut, blacken, seal, and adhere multilayer polymer eyepiece stacks using a single pass of a $CO_2$ laser. The process results in a transparent, multilayer eyepiece with a uniform dark edge. The multilayer eyepiece can be part of a wearable system (e.g., a virtual, mixed, or augmented reality system) utilized to provide three-dimensional perception to a wearer using a plurality of waveguides.

In a first general aspect, fabricating a multilayer optical component includes obtaining a substrate having a multiplicity of polymer layers and cutting the substrate with a $CO_2$ laser to yield a multilayer optical component having a first surface, a second surface opposite the first surface, and a blackened edge along a perimeter of the multilayer optical component. The multiplicity of polymer layers is sealed along the blackened edge.

Implementations of the first general aspect may include one or more of the following features.

Some implementations include laminating the multiplicity of polymer layers to yield the substrate.

In some implementations, an air gap is defined between each adjacent pair of layers of the multiplicity of polymer layers.

Some implementations include an adhesive between each adjacent pair of layers of the multiplicity of polymer layers.

In some implementations, each polymer layer of the multiplicity of polymer layers has an index of refraction in a range of 1.45-1.9.

In some implementations, each polymer layer of the multiplicity of polymer layers has a thickness in a range of 0.3 mm to 0.65 mm.

In some implementations, a thickness of the multilayer substrate is in a range between 2 mm and 2.5 mm thick.

In some implementations, a power of the $CO_2$ laser is between 6 Watts and 8 Watts.

In some implementations, a distance between laser spots is at least 0.2 μm.

In some implementations, the computer numerical control speed of the laser is at least 0.5 meters per minute.

In a second general aspect, a multilayer optical component includes a multiplicity of polymer layers and a blackened edge seal around the multiplicity of polymer layers. The blackened edge seal includes polymer melt from the multiplicity of polymer layers.

Implementations of the second general aspect may include one or more of the following features.

In some implementations, an air gap is defined between each adjacent pair of layers of the multiplicity of polymer layers.

Some implementations an adhesive between each adjacent pair of layers of the multiplicity of polymer layers.

In some implementations, each polymer layer of the multiplicity of polymer layers has an index of refraction in a range of 1.45-1.9.

In some implementations, each polymer layer of the multiplicity of polymer layers has a thickness in a range of 0.3 mm to 0.65 mm.

In some implementation, the multiplicity of polymer layers are laminated.

In some implementations, the multiplicity of polymer layers includes 2 to 10 polymer layers.

In some implementations, a thickness of the multilayer polymer eyepiece is in a range between 2 mm and 2.5 mm thick.

In some implementations, the multilayer optical component is an eyepiece.

A third general aspect includes a multilayer optical component fabricated by a method including obtaining a substrate having a multiplicity of polymer layers, and cutting the substrate with a $CO_2$ laser to yield a multilayer optical component having a first surface, a second surface opposite the first surface, and a blackened edge along a perimeter of the multilayer optical component. The multiplicity of polymer layers is sealed along the blackened edge.

Implementations of the third general aspect may include one or more implementations of the first and second general aspects.

The details of one or more embodiments of the subject matter of this disclosure are set forth in the accompanying drawings and the description. Other features, aspects, and advantages of the subject matter will become apparent from the description, the drawings, and the claims.

DETAILED DESCRIPTION

Figure 1:
FIG. 1 is a flow chart showing steps in a process to fabricate a multilayer polymer eyepiece stack.
Figure 1:
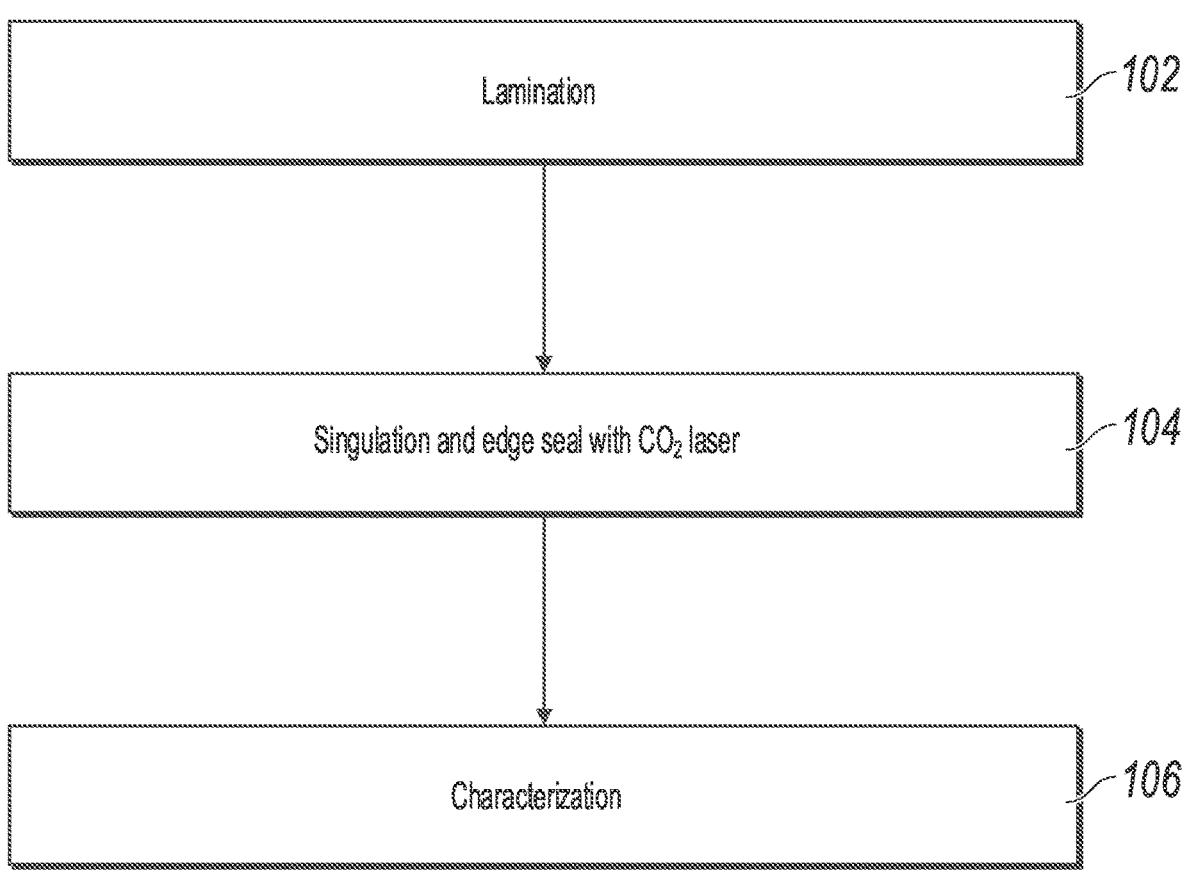

Referring to FIG. 1, process 100 to fabricate a multilayer polymer eyepiece stack. In 102, two or more polymer layers are laminated to yield a substrate in the form of a multilayer polymer stack. In 104, the multilayer polymer stack is singulated and sealed with a single pass of a $CO_2$ laser. The resulting multilayer polymer eyepiece stack can be characterized in step 106. The multilayer polymer eyepiece stack formed by process 100 is a transparent, multilayer eyepiece with a uniform dark edge.

Lamination can include stacking (or superimposing) polymer layers (e.g., two, three, four, five, six, or more polymer layers) and bonding the stacked layers to yield a multilayer polymer stack. The polymer layers can have a thickness in a range between about 0.3 mm and about 0.65 mm (e.g., 0.4 mm). Polymer materials are typically selected to have an index of refraction in a range of 1.45 to 1.9 (e.g., 1.5 to 1.8, 1.65 to 1.75, or 1.7 to 1.8). Suitable materials include sulfur-containing high refractive index polymers. In some cases, air gaps, adhesive, spacers, or any combination thereof are present between the stacked polymer layers. In one example, each air gap can be on the order of about 0.05 mm. Lamination can be achieved by cohesive or adhesive bonding of the polymer layers. In one example, a thickness of a five-layer polymer stack is about 2.2 mm.

Singulation of the multilayer polymer stack includes passing over the eyepiece profile once with a $CO_2$ laser. The $CO_2$ laser separates the eyepiece from the substrate, and heats the polymer during cutting. Heat provided by the $CO_2$ laser melts the edges of the polymer eyepiece and adheres the stacked layers together as the melted polymer cools. The $CO_2$ laser also darkens the cut edge of the stacked layers, creating a uniform dark edge. The dark edge can reduce light transmitted in the waveguide from reflecting off the edge in an uncontrolled manner, and back into the display. The dark edge also prevents outside light from entering a side of the eyepiece. Single pass singulation, blackening, and edge sealing reduces handling of single-layer components and increases the efficiency of the process.

Figure 2:
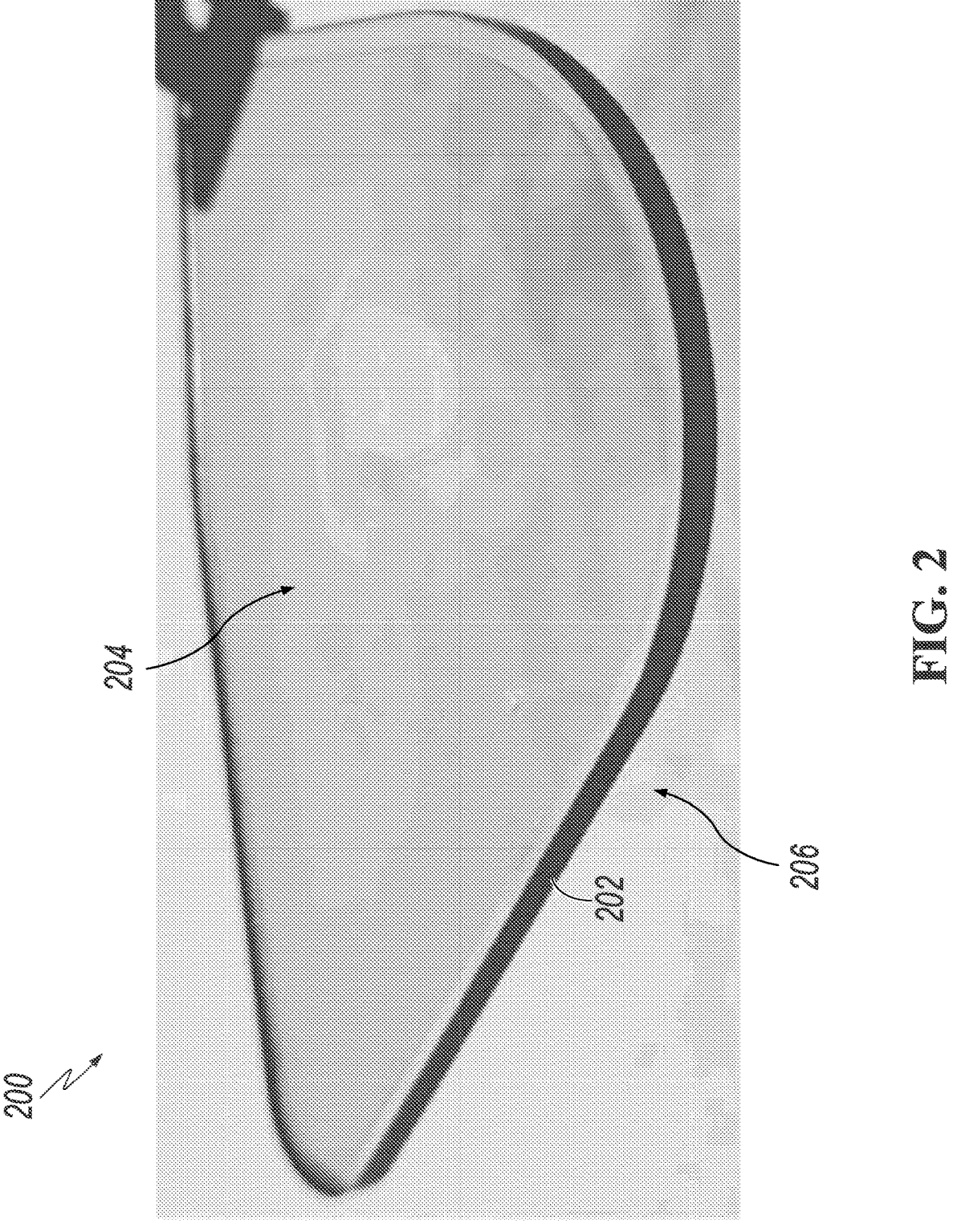
FIG. 2 is an image of a multilayer polymer eyepiece stack formed by the process described with respect to FIG. 1.
Figure 3:
FIG. 3 is an enlarged side view image of a portion of a multilayer polymer eyepiece formed by the process described with respect to FIG. 1.
Figure 4:
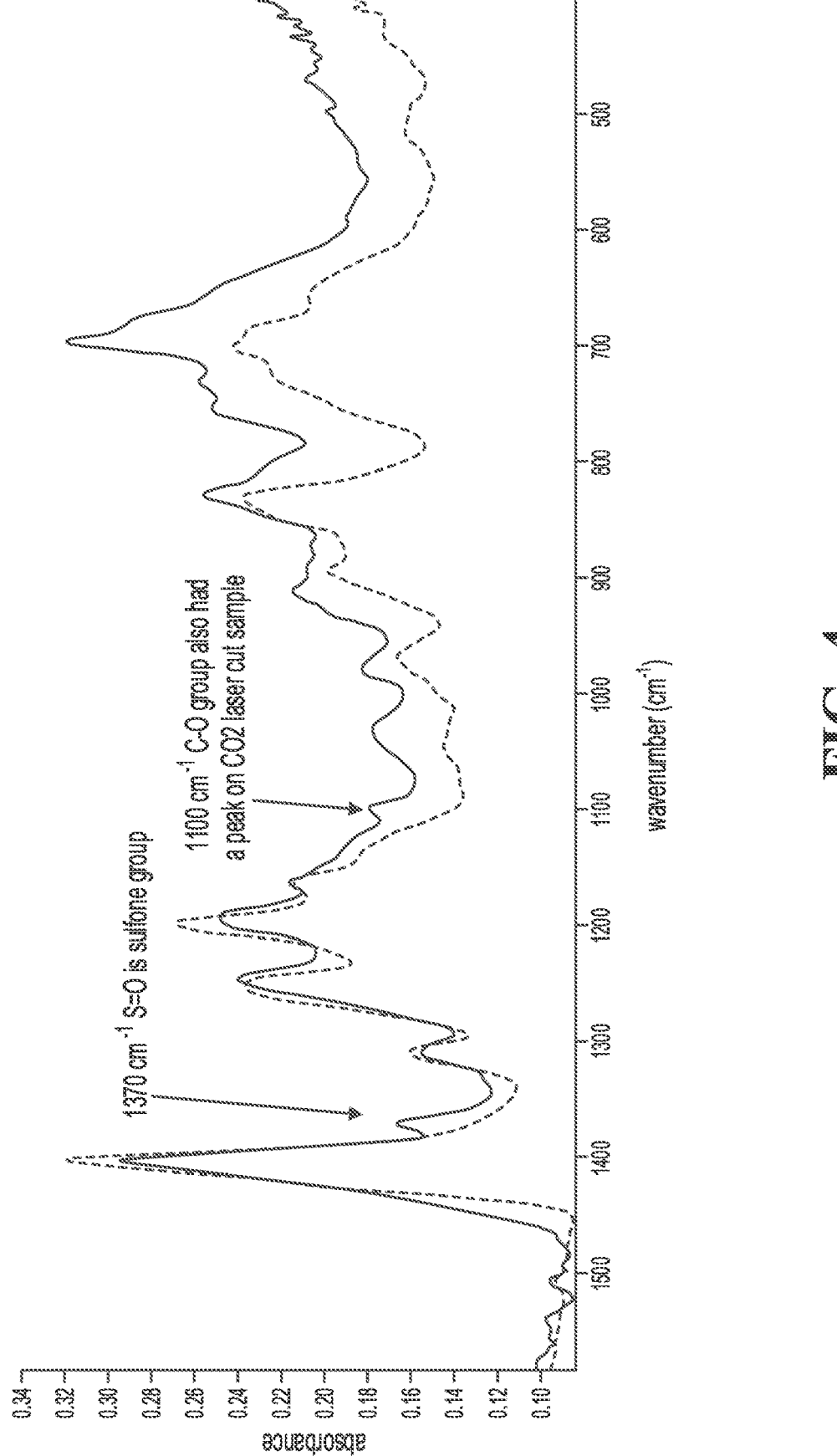
FIG. 4 is a Raman spectrum of blackened material from an edge of a polymer eyepiece formed by the process described with respect to FIG. 1.

FIG. 2 is an image of multilayer polymer eyepiece 200. Multilayer polymer eyepiece 200 includes five polymer layers with no air gaps, laminated without adhesive. The thickness of each layer is about 0.4 mm. Dark edges 202 were imparted by the $CO_2$ laser, and no edge seal material was applied. Multilayer polymer eyepiece 200 includes a surface 204 and a surface 206 opposite surface 204 (surface 206 being on the underside of the eyepiece illustrated in FIG. 2). FIG. 3 is an enlarged image of a side profile view of a multilayer stack 300 (no air gaps) with five layers 302. Layers 302a and 302b appear to be welded together as a result of the laser cutting. The dark edge material from a polymer eyepiece singulated with $CO_2$ laser was analyzed. The spectrum in FIG. 4 shows a peak at 1370 cm⁻¹ attributed to S=O (sulfone) and a peak at 1100 cm⁻¹ attributed to a C—O group.

EXAMPLES

A $CO_2$ laser was used to singulate and edge seal a 5-layer polymer stack. The $CO_2$ laser was a Corning Laser Technologies 45G, with Coherent J3 subassembly. The laser wavelength was 10.6 µm, and the laser power was 6 Watts. The distance between laser spots was 0.2 µm (the minimum allowed by machine software). The substrate focus offset was 0.5 mm, and the multilayer substrate thickness was 1.8-2.7 mm. The laser computer numerical control (CNC) speed was 0.5 meters per minute (the minimum allowed by machine software to be synchronized with distance between spots). Accuracy of the dimensions cut by the $CO_2$ laser was measured as ±125 µm for a single layer.

Figure 5:
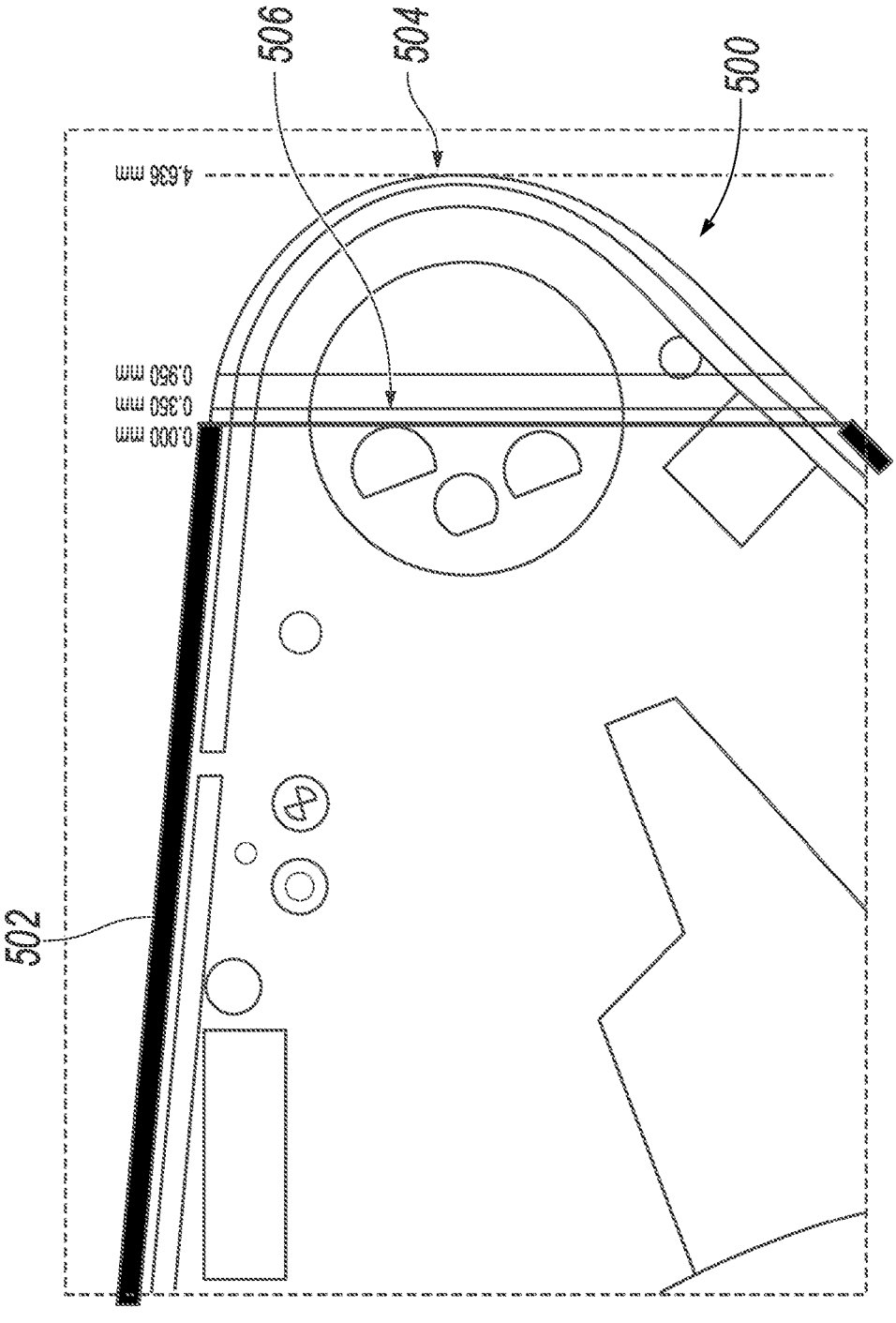
FIG. 5 depicts partial edge blacking on a temporal edge of a laser cut polymer eyepiece.
Figure 6:
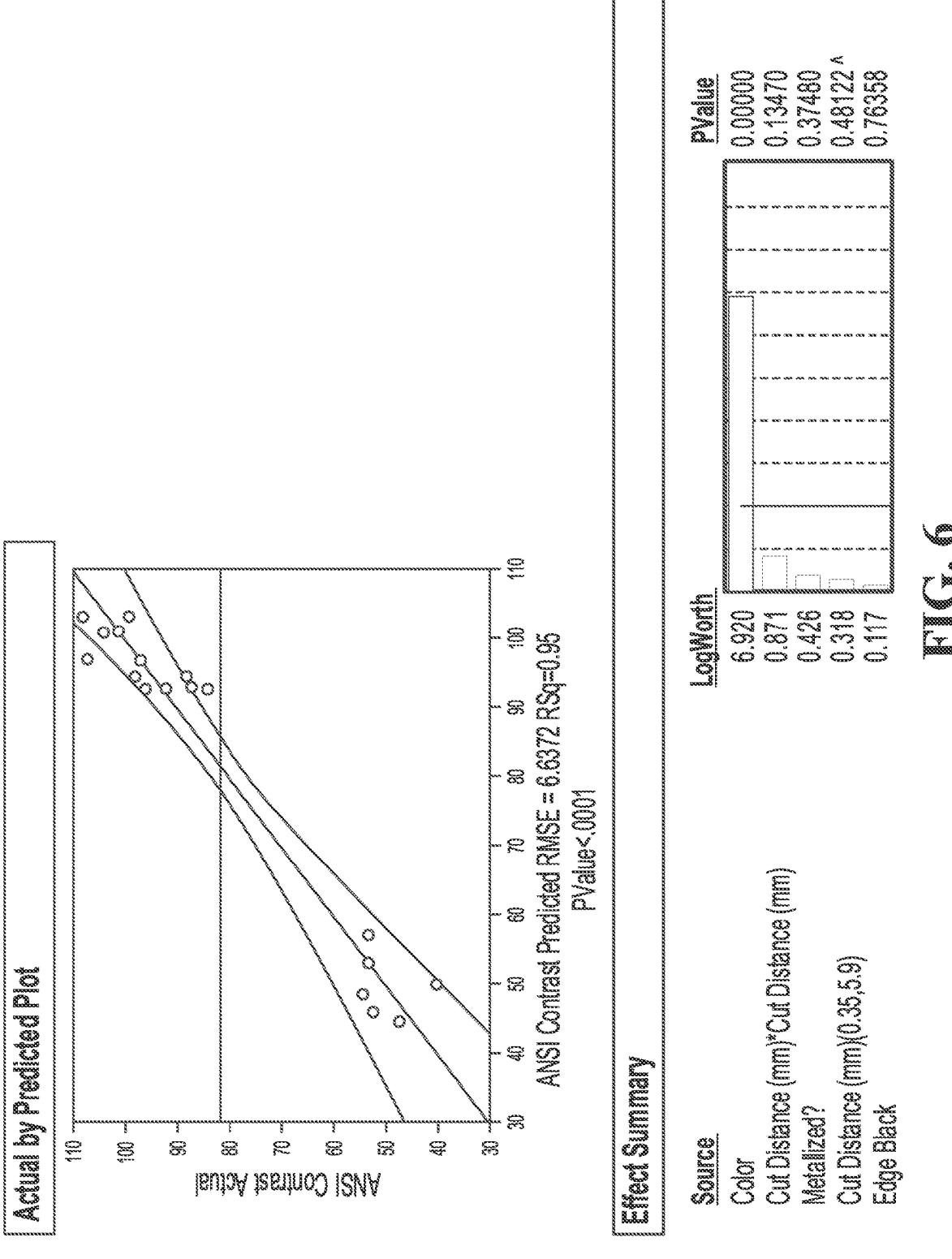
FIG. 6 shows the significant factors of a contrast experiment with and without blacking on the temporal edge of polymer eyepieces.

In a separate example, optical performance of the dark edge from a $CO_2$ laser cut was evaluated by partial edge blackening of single-layer eyepiece 500 as depicted in FIG. 5. Eyepieces 500 were singulated by a $CO_2$ laser. Carbon black was applied to temporal edge portion 502 of some eyepieces but not others. Laser cut 504 is indicates $CO_2$ laser cut around the perimeter. Boundary 506 is the approximate boundary of Edge Black for All Except Edge Near GS samples (independent of cut). FIG. 6 shows contrast of $CO_2$ laser-cut eyepieces with and without carbon black on the temporal edge. The difference in contrast between edge portion 502 with and without carbon black was found to be statistically insignificant, suggesting that the dark edge from a $CO_2$ laser cut on the temporal edge is sufficient to achieve good contrast performance.

Although this disclosure contains many specific embodiment details, these should not be construed as limitations on the scope of the subject matter or on the scope of what may be claimed, but rather as descriptions of features that may be specific to particular embodiments. Certain features that are described in this disclosure in the context of separate embodiments can also be implemented, in combination, in a single embodiment. Conversely, various features that are described in the context of a single embodiment can also be implemented in multiple embodiments, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular embodiments of the subject matter have been described. Other embodiments, alterations, and permutations of the described embodiments are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results.

Accordingly, the previously described example embodiments do not define or constrain this disclosure. Other changes, substitutions, and alterations are also possible without departing from the spirit and scope of this disclosure.

What is claimed is:

1. A multilayer optical component comprising:
   a multiplicity of polymer layers;
   a blackened edge seal around the multiplicity of polymer layers, wherein the blackened edge seal comprises polymer melt from the multiplicity of polymer layers.

2. The multilayer optical component of claim 1, wherein an air gap is defined between each adjacent pair of layers of the multiplicity of polymer layers.

3. The multilayer optical component of claim 1, further comprising an adhesive between each adjacent pair of layers of the multiplicity of polymer layers.

4. The multilayer optical component of claim 1, wherein each polymer layer of the multiplicity of polymer layers has an index of refraction in a range of 1.45-1.9.

5. The multilayer optical component of claim 1, wherein each polymer layer of the multiplicity of polymer layers has a thickness in a range of 0.3 mm to 0.65 mm.

6. The multilayer optical component of claim 1, wherein the multiplicity of polymer layers are laminated together to yield a multilayer polymer stack.

7. The multilayer optical component of claim 1, wherein a thickness of the multilayer optical component is in a range between 2 mm and 2.5 mm thick.

8. The multilayer optical component of claim 1, wherein the multilayer optical component is an eyepiece.

* * * * *